US012691505B2

(12) United States Patent
Tokubi

(10) Patent No.: US 12,691,505 B2
(45) Date of Patent: Jul. 28, 2026

(54) DRILLING DEVICE

(71) Applicant: Honda Motor Co., Ltd., Tokyo (JP)

(72) Inventor: Kota Tokubi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 776 days.

(21) Appl. No.: 17/848,397

(22) Filed: Jun. 24, 2022

(65) Prior Publication Data

US 2023/0415243 A1     Dec. 28, 2023

(51) Int. Cl.
B23B 47/26 (2006.01)
B23B 39/14 (2006.01)

(52) U.S. Cl.
CPC .............. B23B 39/14 (2013.01); B23B 47/26 (2013.01); *B23B 2260/062* (2013.01); *B23B 2270/022* (2013.01)

(58) Field of Classification Search
CPC ... B23B 39/14; B23B 49/00; B23B 2260/116; Y10T 408/556; Y10T 408/5612; Y10T 408/554; Y10T 408/91; B23Q 9/02; B23Q 9/0007; B23Q 9/0014; B23Q 39/02; B25H 1/00; B25H 1/0021; B25H 1/0035; B25H 1/0057; B25H 1/0064; B25H 1/10; B25D 17/32
See application file for complete search history.

(56) References Cited

U.S. PATENT DOCUMENTS

| | | | | |
|---|---|---|---|---|
| 2,546,957 A | * | 3/1951 | Ray | D06H 1/003 408/98 |
| 2,669,135 A | * | 2/1954 | Moore | B23Q 1/267 408/128 |
| 5,093,984 A | * | 3/1992 | Lape | H05K 13/0061 29/762 |
| 6,129,489 A | * | 10/2000 | Linderholm | B23Q 9/0014 409/178 |
| 6,315,059 B1 | * | 11/2001 | Geldean | E21B 7/028 173/147 |
| 10,245,715 B2 | * | 4/2019 | Merello | B25D 17/32 |
| 2003/0108395 A1 | * | 6/2003 | Douglas | B23Q 9/02 408/76 |
| 2015/0003927 A1 | * | 1/2015 | Spishak | G05B 19/182 408/1 R |
| 2018/0326507 A1 | * | 11/2018 | Halvorsen | B25J 9/1679 |
| 2021/0229254 A1 | * | 7/2021 | Merello | B23B 39/14 |

FOREIGN PATENT DOCUMENTS

| | | |
|---|---|---|
| JP | 3200079 | 10/2015 |

* cited by examiner

*Primary Examiner* — Nicole N Ramos
(74) *Attorney, Agent, or Firm* — JCIPRNET

(57) ABSTRACT

A drilling device, including a motor, a battery, and a frame. The battery is electrically connected to the motor. The frame includes a base, a column supported by the base, and a drill support part configured to be movable relative to the base. The battery is disposed on the base such that the drill support part is configured to be movable relative to the battery.

14 Claims, 5 Drawing Sheets

DRILLING DEVICE

BACKGROUND

Technical Field

The disclosure relates to a drilling device and more specifically relates to a battery coupled to the drilling device.

Description of Related Art

In Patent Literature 1, a battery is mounted on a drill such that the battery is fixed to the drill. In this configuration, the battery is not movable relative to the drill. The present disclosure provides a battery mounting system which may increase stability of the drill when drilling.

Patent literature 1: Japanese Patent No. 3200079

SUMMARY

According to an embodiment of the disclosure, a drilling device includes a motor, a battery, and a frame. The battery is electrically connected to the motor. The frame includes a base, a column supported by the base, and a drill support part configured to be movable relative to the base. The battery is disposed on the base such that the drill support part is configured to be movable relative to the battery.

DESCRIPTION OF THE EMBODIMENTS

Figure 1:
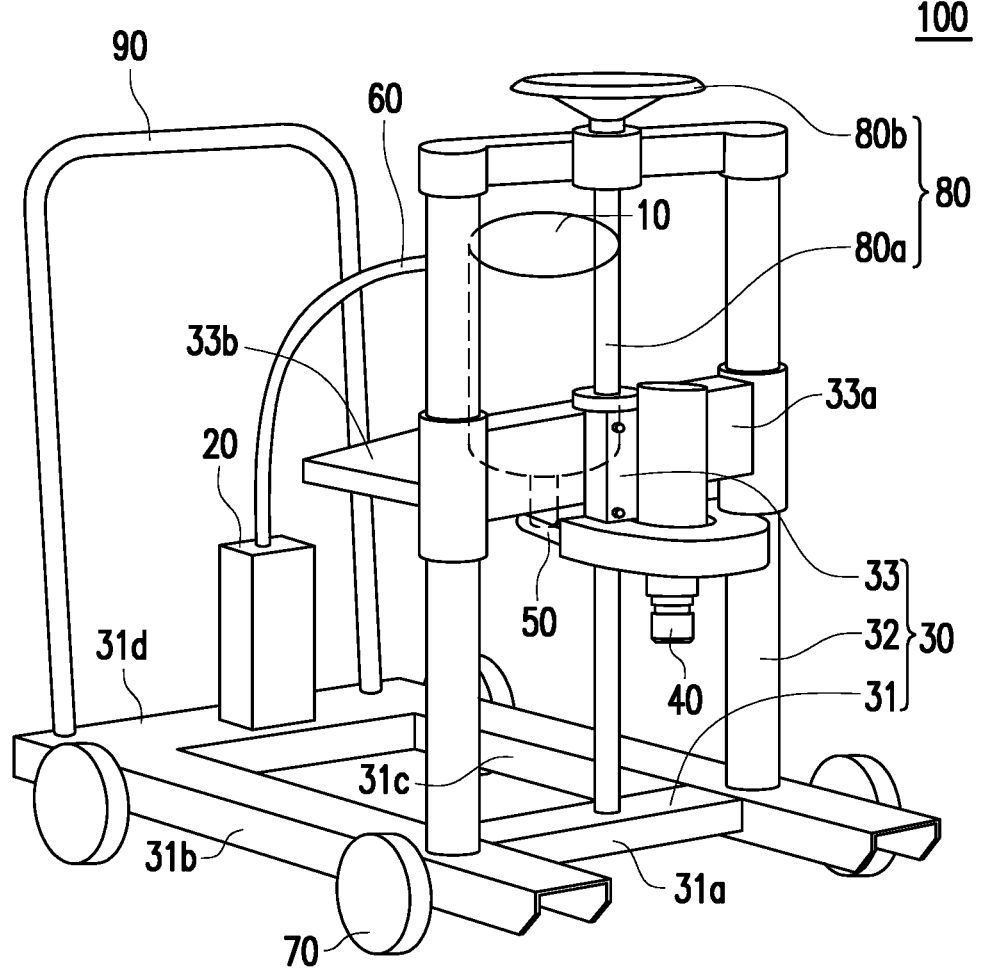
FIG. 1 is a schematic diagram illustrating a perspective view of a drilling device according to an embodiment of the disclosure.

FIG. 1 is a schematic diagram illustrating a perspective view of a drilling device according to an embodiment of the disclosure. Referring to FIG. 1, a drilling device 100 is provided. The drilling device 100 may be, for example, a core drill. The drilling device 100 includes a motor 10, a battery 20, a frame 30, and an actuator 80.

The motor 10 is an electric motor powered by electricity. That is to say, the motor 10 is not powered by gas, and there is no gas tank connected to the motor 10. The motor 10 may be, for example, a brushless DC motor. In more detail, the motor 10 may be, for example, a 3 phase brushless DC motor. The battery 20 is electrically connected to the motor 10. In the present embodiment, a wire 60 electrically connects the battery 20 to the motor 10. In this way, the motor 10 is powered by the battery 20 through the wire 60. The wire 60 may be, for example, a power cable wherein one end of the power cable is coupled to a positive terminal and a negative terminal of the battery 20, while another end of the power cable is coupled to the motor 10.

Figure 5:
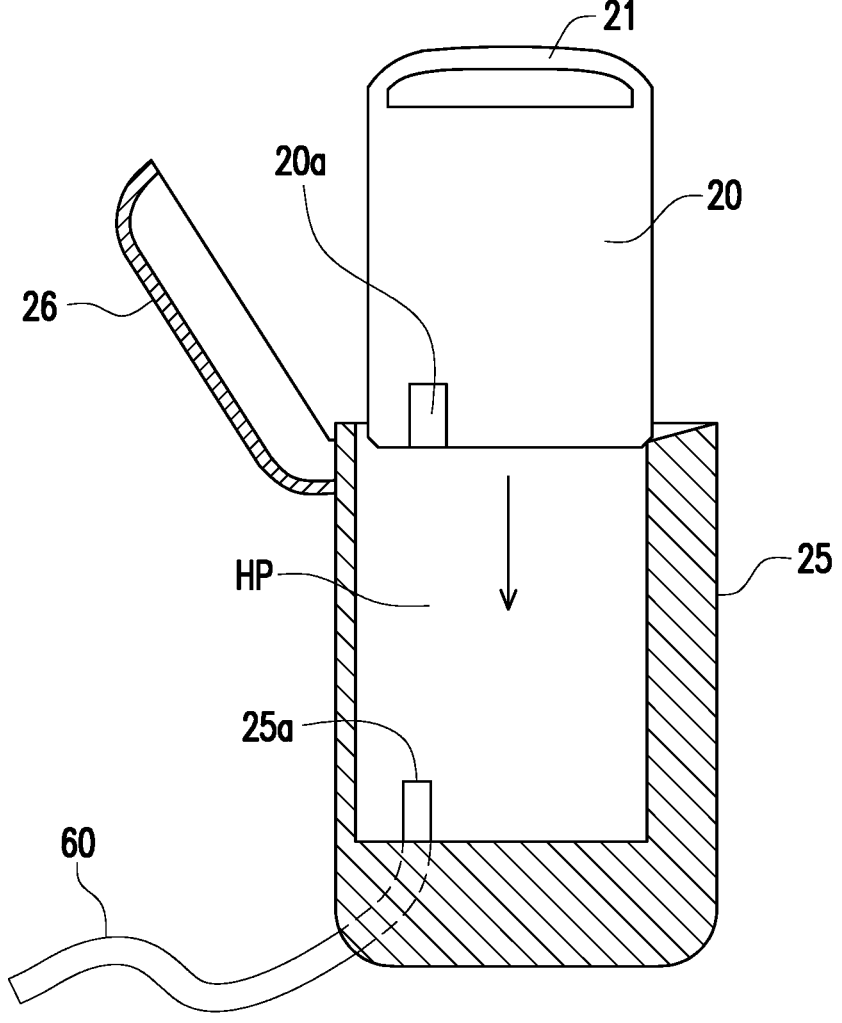
FIG. 5 is a schematic diagram illustrating a battery casing and a battery of the drilling device according to an embodiment of the disclosure.

FIG. 5 is a schematic diagram illustrating a battery casing and a battery of the drilling device according to an embodiment of the disclosure. Referring to FIG. 5, the drilling device 100 includes a casing 25 for housing the battery 20. The casing 25 may be disposed on the base 31 of the drilling device 100. The casing 25 may be fixed to the base 31. The casing 25 may be hollow such that the battery 20 may be inserted into a hollow portion HP of the casing 25 and the battery 20 may be removed from the casing 25 when swapping or removing the battery 20. That is to say, the battery 20 is configured to be accommodated inside the hollow portion HP of the casing 25. The battery 20 includes a handle 21 for easy swapping of the battery 20. In an embodiment of the disclosure, the hollow portion HP of the casing 25 may have a substantially similar shape as an outer casing of the battery 20 so as to better house the battery 20.

The casing 25 includes a first connection terminal 25a. More specifically, the first connection terminal 25a is disposed at the bottom of the hollow portion HP of the casing 25. The first connection terminal 25a is disposed at the bottom of the casing 25 to face toward an opening of the casing 25. The battery 20 is configured to be inserted through the opening of the casing 25. The first connection terminal 25a of the casing 25 is electrically connected to the one end of the wire 60. In addition, the casing 25 includes a cover 26 which is pivoted on a hinge (not shown), wherein the cover 26 may be opened or closed about the hinge to prevent dust or particles to enter the hollow portion HP of the casing 25.

The battery 20 includes a second connection terminal 20a on a bottom surface of the battery 20. The second connection terminal 20a is electrically connected to the battery 20. The casing 25 and the battery 20 are configured such that, when the battery 20 is inserted into the hollow portion HP of the casing 25, the first connection terminal 25a of the casing 25 physically engages with the second connection terminal 20a of the battery 20, such that the motor 10 may be electrically powered by the battery 20. In the present embodiment, the first connecting terminal 25a is a male connector and the second connecting terminal 20a is a female connector, wherein the male connector 25a is inserted into the female connector 20a. In another embodiment of the disclosure, the first connecting terminal may be a female connector and the second connecting terminal may be a male connector. The drilling device 100 may have an operation panel including a switch to turn the motor 10 ON and OFF.

The frame 30 includes a base 31, a pair of columns 32 supported by the base 31, and a drill support part 33 adapted to support a drill (not shown). The base 31 is, for example, a rigid substrate. A material of the base 31 may be, for example, metal, steel, aluminum, composite material and the like. In the present embodiment, the base 31 includes a first substrate 31a, a second substrate 31b, a third substrate 31c and a fourth substrate 31d. The first substrate 31a, the second substrate 31b, the third substrate 31c and the fourth substrate 31d are connected to form a substantially rectangular base 31 having a hole (opening) at the center. The first substrate 31a, the second substrate 31b, the third substrate 31c and the fourth substrate 31d may be connected by welding and/or by using a fastener and the like. In another embodiment, the base 31 including the first substrate 31a, the second substrate 31b, the third substrate 31c and the fourth substrate 31d may be formed as one piece. In another embodiment of the disclosure, the base 31 may be a plate shaped substrate with no hole (opening). A shape of the base 31 is not intended to limit the disclosure and may be set accordingly to requirements.

The pair of columns 32 are fixed to the base 31. The pair of columns 32 protrude upward from the base 31 and form an orthogonal angle between the base 31 and the pair of columns 32. The pair of columns 32 may be fixed to the base 31 by, for example, a fastener or welding and the like. In an embodiment of the disclosure, the frame 30 may include one column 32 instead of a pair of columns 32. In another embodiment of the disclosure, the number of columns 32 may be greater than two. The number of columns 32 is not intended to limit the disclosure, and may be set according to requirements.

The pair of column 32 protrude from the base 31, and extend parallel to each other. In the present embodiment, a cross section of the column 32 is circular. However, the disclosure is not limited thereto. In another embodiment of the disclosure, a cross section of the column 32 may be, for example, rectangular, polygonal, triangular shape and/or the like. The shape of the cross section of the column 32 may be set according to requirements.

The drill support part 33 is coupled to the pair of columns 32 such that the drill support part 33 is slidable on the pair of columns 32. That is to say, the drill support part 33 is configured to be movable relative to the base 31. In more detail, the drill support part 33 includes a linear motion bearing while the column 32 acts as a guide. In the present embodiment, the drill support part 33 includes a pair of linear motion bearings that are coupled to the pair of columns 32 respectively, wherein one linear motion bearing is coupled to one column 32. The drill support part 33 includes a first plate 33a disposed between the two linear motion bearings and connects the two linear motion bearings. The drill support part 33 may further include a second plate 33b disposed between the two linear motion bearings, wherein the second plate 33b is disposed orthogonal to the first plate 33a. More specifically, an extending direction of the first plate 33a and an extending direction of the second plate 33b intersect each other to form a 90 degree angle. The second plate 33b may include a hole for a rotation axis of the motor 10 to pass through.

The linear motion bearing may be a linear ball bearing such that the drill support part 33 may slide on the pair of columns 32. In another embodiment of the disclosure, the linear motion bearing may be a linear rail slide (or a linear rail sliding block) coupled to a linear rail, wherein the linear rail is disposed on the column 32. In this way, the drill support part 33 may slide on the pair of columns 32. The linear motion bearing is not limited thereto, and other linear motion bearings may be used according to requirements. In this way, the drill support 33 may be coupled to the column 32 such that the drill support part 33 is slidable along the column 32. That is to say, the drill support 33 is coupled to the column 32 such that the drill support part 33 is slidable along the column 32 so that an imaginary line defined by the trajectory of the drill support part 33 is parallel to the column 32 (or pair of columns 32).

The actuator 80 is coupled to the drill support part 33 and is configured to move (to actuate) the drill support part 33 towards the base 31 and away from the base 31. The actuator 80 is a mechanism or means for moving the drill support part 33. In the present embodiment, the actuator 80 includes a screw 80a and a handle 80b fixed to the screw 80a, wherein the screw 80a is rotated by rotating the handle 80b. For example, when viewing from the top view of drilling device 100, when the screw 80a is rotated clockwise, the drill support part 33 is moved upward and away from the base 31, and when the screw 80a is rotated counter clockwise, the drill support part 33 is moved downward and towards the base 31. The screw 80a may be, for example, a lead screw or a ball screw and the like. In another embodiment of the disclosure, the screw 80a may be rotated by a motor instead of the handle 80b.

In another embodiment of the disclosure, the actuator 80 may include, for example, a hydraulic press or a pneumatic press to move the drill support part 33 towards the base 31 and away from the base 31. The actuator 80 is a mechanism or means for moving the drill support part 33. For example, one end of the press (hydraulic or pneumatic and the like) may be coupled or fixed to the drill support part 33 while another end of the press may be coupled or fixed to the column 32. The press is coupled to the drill support part 33 and is configured to move (to actuate) the drill support part 33 towards the base 31 and away from the base 31.

As described in some example embodiments above, the actuator 80 may include a screw 80a, a handle 80b, a power source such as a motor, a hydraulic press, a pneumatic press, and/or a cylinder and the like. However, the disclosure is not limited thereto. The actuator 80 is a mechanism or means for moving the drill support part 33. The actuator 80 may move the drill support part 33 by human generated power (such as by the screw and handle or the like) or machine generated power (such as by the motor or press or the like) according to requirements.

The battery 20 is disposed on the base 31, such that the drill support part 33 is configured to be movable relative to the battery 20. In other words, the battery 20 is not disposed on the drill support part 33. In more detail, the battery 20 is fixed to the base 31 such that the battery 20 is not movable relative to the base 31 when the drill support part 33 is moved by the actuator 80. Since the battery 20 is disposed on the base 31 and not disposed on the drill support base 33, therefore when the actuator 80 moves the drill support part 33, the drill support part 33 moves relative to the battery 20. More specifically, the drill support part 33 is moved towards the battery 20 and away from the battery 20 by the actuator 80. By disposing the battery 20 on the base 31 (instead of on the drill support part 33), the base 31 may be pressed from the top during drilling using the weight of the battery 20 such that stability of the drilling device 100 may be increased when drilling.

Referring to FIG. 1, the motor 10 is disposed on the drill support part 33 such that the motor 10 is movable relative to the battery 20. In more detail, the motor 10 is fixed to the drill support part 33 such that the motor 10 is not movable relative to the drill support part 33 while the drill support part 33 is moved by the actuator 80. In more detail, the motor 10 may be fixed to the first support plate 33a and/or the second support plate 33b of the drill support part 33 by, for example, a fastener. By disposing the motor 10 on the drill support part 33, a power transmission distance from the motor 10 to a drill (now shown) attached to an end of the drill holder 40 may be short. In the present embodiment, a rotation axis of the motor is parallel with an axis of the column 32. However, the disclosure is not limited thereto. In another embodiment of the disclosure, the rotation axis of the motor may cross with the axis of the column 32.

The drill (not shown) is attached to an end of the drill holder 40, and extends from the drill holder 40 towards the base 31. More specifically, the axial direction of the drill is parallel to the axial direction of the column 32. The drill holder 40 may be, for example, a chuck or a collet. That is to say, the drill may be fixed to a chuck or a collet. In the present embodiment, a rotation of the motor 10 is transmitted to the drill holder 40 and the drill (not shown) by a belt 50. That is to say, the belt 50 couples the rotation of the rotation axis of the motor 10 to the rotation of the drill holder 40 and the drill that is fixed to the drill holder 40. However, the disclosure is not limited thereto, and rotation of the motor 10 may be coupled to the rotation of the drill by a gear and the like. Furthermore, a gear may be coupled between the motor and the drill to vary the torque of the drill according to requirements.

When the battery 20 and motor 10 are electrically connected by the wire 60, electrical power may be supplied to the motor 10 even when the battery 20 is disposed at different locations of the drilling device 100. For example, in the present embodiment, electrical power may be supplied to the motor 10 from the battery 20 even when the motor 10 is movable relative to the battery 20.

The drilling device 100 further includes a plurality of wheels 70 attached to the frame 30. In the present embodiment, the plurality of wheels 70 are fixed to the base 31. However, the disclosure is not limited thereto and the plurality of wheels 70 may be attached to other portions of the drill device 100 instead of the base 31 according to requirements. A number of the wheels 70 is not intended to limit the disclosure. The wheel 70 may allow for easy transportation of the drill device 100, since the drill device 100 may be transported on the wheels 70.

In an embodiment of the disclosure, the base 31 may include stands (not shown) such that the wheels 70 may be elevated off the ground to prevent the drilling device 100 from rolling on the wheels 70 during drilling. The stands may also be used to level the drilling device 100. The stands may include threads such that the stands may be fastened into the base 31 or out of the base 31 such that a protruding distance of the stands from the base 31 may be adjusted according to requirements. A number of the stands is not intended to limit the disclosure.

The drilling device 100 further includes a hand bar 90 attached to the frame 30. In the present embodiment, the hand bar 90 is fixed to the base 31. However, the disclosure is not limited thereto and the hand bar 90 may be attached to other portions of the drill device 100 instead of the base 31 according to requirements. The hand bar 90 may be fixed to the drilling device by welding or a fastener and the like. The hand bar 90 allows for easy transportation of the drill device 100 by an operator, since the drill device 100 may be transported on the wheels 70 by pushing or pulling the hand bar 90.

The battery 20 may be, for example, a portable, swappable battery that stores electricity generated by renewable energy. In the present embodiment, the battery 20 is a rechargeable battery. The battery 20 may be recharged with renewable energy. The battery 20, for example, includes a plurality of battery cells inside the battery 20. The battery 20 may be detachably attached to the base 31. When the battery 20 is detachably attached to the base 31, a new battery may be simply swapped such that supplying a power source to the motor 10 becomes easy.

The battery 20 may be a lithium-ion battery. In the present embodiment, the battery 20 weighs, for example, approximately 10 kilograms. By disposing the battery 20 on the base 31 (instead of on the drill support part 33), the base 31 may be pressed from the top during drilling using the weight of the battery 20 such that stability of the drilling device 100 may be increased when drilling. The battery 20 may have, for example, a rated voltage of approximately 50 volts and a rated capacity of approximately 26 amp hours or approximately 1300 watt hours.

Figure 2:
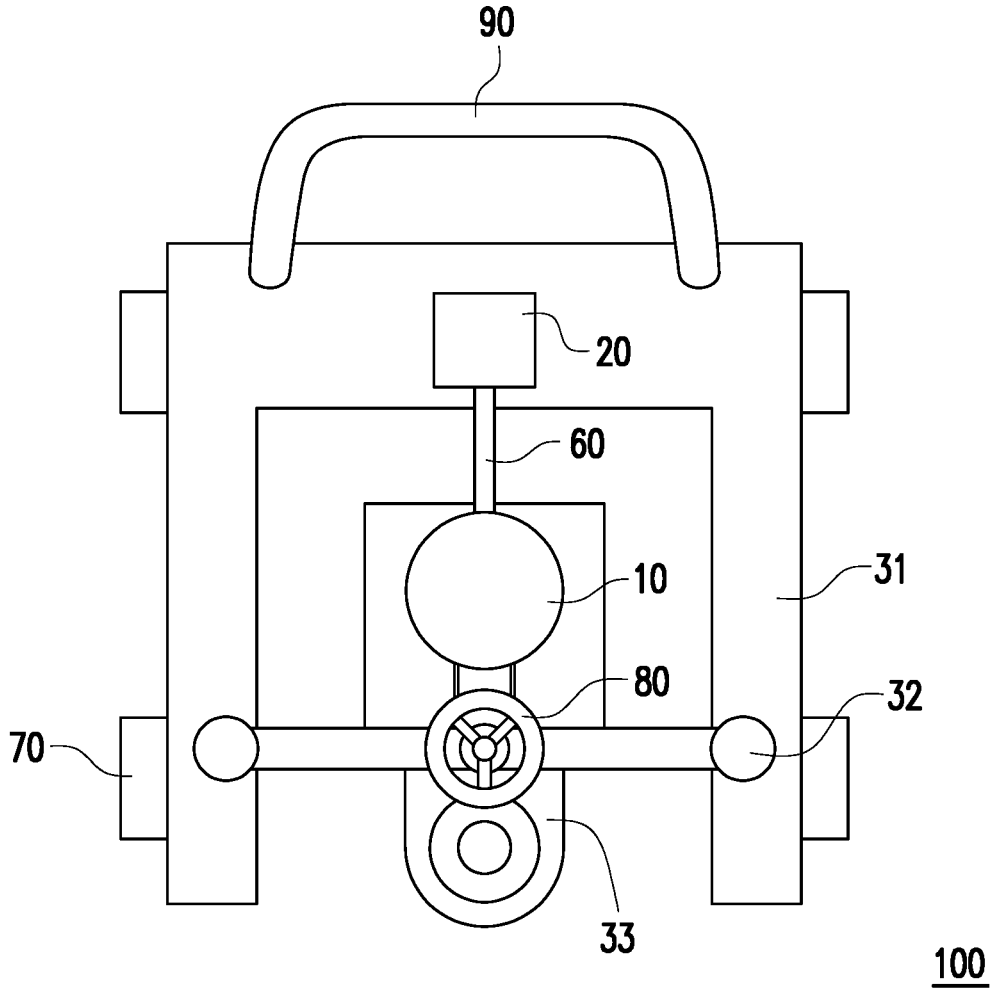
FIG. 2 is a schematic diagram illustrating a top view of the drilling device of FIG. 1.

FIG. 2 is a schematic diagram illustrating a top view of the drilling device of FIG. 1. Referring to FIG. 2, when viewed in an axial direction of the drill (not shown) that is attached to the end of the drill holder 40, the battery 20 is disposed such that the battery 20 and the drill do not overlap with each other. In other words, when viewed in the axial direction of the drill (or the axial direction of the column 32), a gap is formed between an outer diameter of the drill and a casing of the battery 20, such that they do not overlap each other. Since the axial direction of the drill and the axial direction of the column 32 are parallel to each other, therefore when viewed in an axial direction of the column 32 or an axial direction of the drill, the battery 20 is disposed such that the battery 20 and the drill do not overlap with each other. In this way, the placement of the battery 20 does not interfere with excavation work of the drill when the drill is moved by the actuator 80 via the drill support part 33.

Referring to FIG. 2, when viewed in an axial direction of the drill, the battery 20 is disposed such that the battery 20 and the drill support part 33 do not overlap with each other. In other words, when viewed in the axial direction of the drill, a gap is formed between a casing of the battery 20 and the drill support part 33, such that they do not overlap each other. In this way, the placement of the battery 20 does not interfere with an up/down movement of the drill support part 33 when the drill support part 33 is moved by the actuator 80.

Referring to FIG. 2, when viewed in an axial direction of the drill, the battery 20 is disposed such that the battery 20 and the motor 10 do not overlap with each other. In other words, when viewed in the axial direction of the drill, a gap is formed between a casing of the battery 20 and the motor 10, such that they do not overlap each other. In this way, the placement of the battery 20 does not interfere with an up/down movement of the motor 10 when the motor 10 is moved by the actuator 80 via the drill support part 33.

Figure 3:
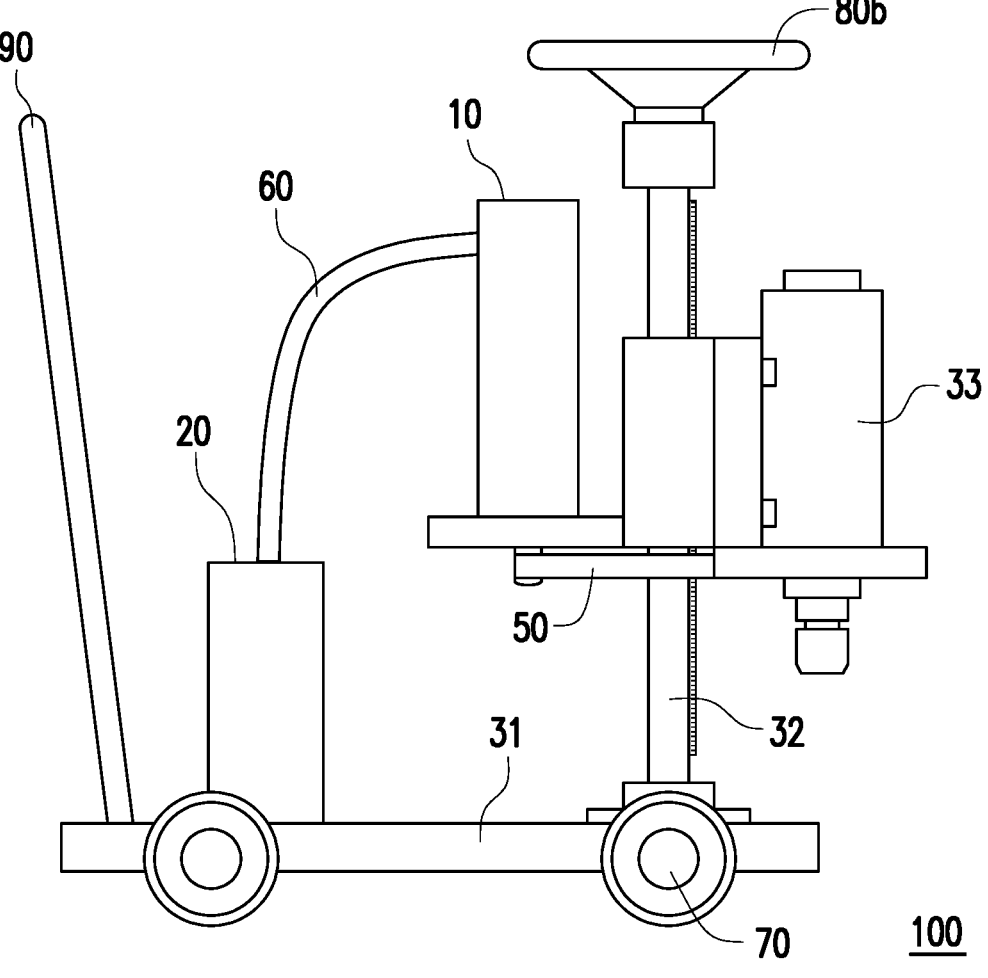
FIG. 3 is a schematic diagram illustrating a side view of the drilling device of FIG. 1.

FIG. 3 is a schematic diagram illustrating a side view of the drilling device of FIG. 1. Referring to FIG. 3, when viewed in a direction orthogonal to the axial direction of the column 32, the drill (and the drill holder 40) is disposed on one side of the column 32 while the battery 20 is disposed on another side of the column 32 opposite to the one side. In other words, when viewed in an axis direction of the wheel 70, the column 32 is disposed between the motor 10 and the drill. In addition, the column 32 is disposed between the motor 10 and the drill holder 40. In this way, the battery 20 does not interfere with a movable range of the drill.

Figure 4:
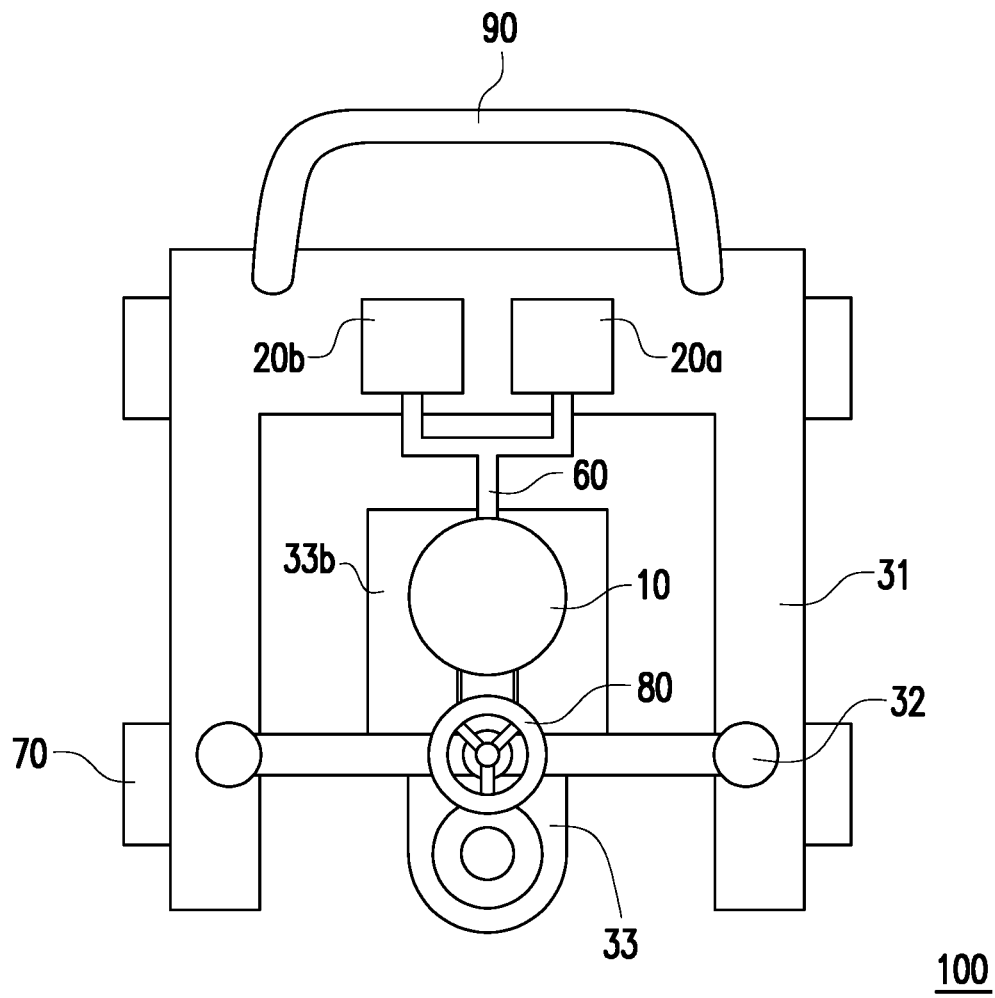
FIG. 4 is a schematic diagram illustrating a top view of a drilling device according to an embodiment of the disclosure.

FIG. 4 is a schematic diagram illustrating a top view of a drilling device according to an embodiment of the disclosure. Referring to FIG. 4, in an embodiment of the disclosure, the battery 20 may include a plurality of batteries 20 disposed on the base 31. That is to say, the drilling device 100 may include a first battery 20a disposed on the base 31 and a second battery 20b disposed on the base 31 such that the drill support part 33 is movable relative to the first battery 20a and the second battery 20b, wherein first battery 20a and the second battery 20b are electrically connected to the motor 10. Each battery weighs, for example, approximately 10 kilograms. In this way, the base 31 may be pressed from the top during drilling using the weight of the first battery 20a and the second battery 20a such that stability of the drilling device 100 may be increased when drilling. By providing a plurality of batteries 20, a usage time of the drilling device 100 may be extended. In addition, the plurality of batteries 20 may be connected in series or parallel according to power requirements, and/or according to the specification of the motor 10. A number of the plurality of batteries 20 are not intended to limit the disclosure and may be set according to requirements. The plurality of batteries 20 may be disposed at various location where they do not interfere with excavation work of the drill when the drill is moved by the actuator 80 via the drill support part 33. That is to say, the plurality of batteries 20 may be disposed so as to not interfere with the movement of the drill, the motor 10, and the drill support part 33.

In the embodiments shown in FIG. 3, the battery 20 is disposed on the fourth substrate 31*d*. However, the disclosure is not limited thereto. For example, in another embodiment of the disclosure, the battery 20 may be disposed on the second substrate 31*b* or the third substrate 31*c*.

In the embodiments shown in FIG. 4, the first battery 20*a* and the second battery 20*b* are disposed on the fourth substrate 31*d*. However, the disclosure is not limited thereto. For example, in another embodiment of the disclosure, the first battery 20*a* may be disposed on the second substrate 31*b* and the second battery 20*b* may be disposed on the third substrate 31*c*.

In an embodiment of the disclosure, the drilling device 100 may further include a means for securing the drilling device 100 to the target to be drilled (for example, the ground). For example, the base 31 of the frame 30 may include a hole such that a fastener such as a bolt may be inserted to the hole of the base 31 to secure the drilling device 100 to the target to be drilled.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A drilling device, comprising:
a motor;
a battery, electrically connected to the motor;
a frame, comprising:
  a base;
  a column, supported by the base;
  a drill support part, configured to be movable relative to the base;
wherein the battery is disposed on the base, such that the drill support part is configured to be movable relative to the battery,
wherein the drilling device further comprises a drill holder fixed to the drill support part, and when viewed in a direction orthogonal to an axial direction taken from a bottom end of the column to a top end of the column, the drill holder is disposed on a front side of the column along a front-rear direction taken from the battery to the column and the battery is disposed on a rear side of the column opposite to the front side along the front-rear direction.

2. The drilling device according to claim 1, further comprising:
a wire, electrically connecting the battery to the motor;
an actuator, coupled to the drill support part and configured to move the drill support part towards the base and away from the base;
a wheel attached to the frame; and
a hand bar attached to the frame;

wherein the drill support part is coupled to the column such that the drill support part is slidable on the column.

3. The drilling device according to claim 2, wherein the motor is a brushless DC motor, and the drill support part is coupled to the column.

4. The drilling device according to claim 3, further comprising a drill attached to the drill holder, wherein the motor is disposed on the drill support part such that the motor is movable relative to the battery.

5. The drilling device according to claim 4, wherein when viewed in the axial direction of the column, the battery is disposed such that the battery and the drill do not overlap with each other.

6. The drilling device according to claim 5, wherein the battery is detachably attached to the base.

7. The drilling device according to claim 4, wherein when viewed in the axial direction of the column, the battery is disposed such that the battery and the drill support part do not overlap with each other.

8. The drilling device according to claim 7, wherein the battery is detachably attached to the base.

9. The drilling device according to claim 4, wherein when viewed in the axial direction of the column, the battery is disposed such that the battery and the motor do not overlap with each other.

10. The drilling device according to claim 9, wherein the battery is detachably attached to the base.

11. The drilling device according to claim 2, further comprising a second column supported by the base, wherein the drill support part is coupled to the second column such that the drill support part is slidable on the second column.

12. The drilling device according to claim 1, wherein the battery is a rechargeable battery.

13. The drilling device according to claim 1, further comprising a second battery disposed on the base such that the drill support part is movable relative to the second battery, wherein the second battery is electrically connected to the motor.

14. A drilling device, comprising:
a motor;
a battery, electrically connected to the motor;
a frame, comprising:
  a base;
  a column, supported by the base;
  a drill support part, configured to be movable relative to the base;
wherein the battery is disposed on the base, such that the drill support part is configured to be movable relative to the battery,
wherein the drilling device further comprises a drill holder fixed to the drill support part, a front wheel attached to the frame and a rear wheel attached to the frame, and the front wheel is located between the drill holder and the rear wheel along a front-rear direction taken from the battery to the column,
wherein a rotation axis of the front wheel and a rotation axis of the rear wheel are perpendicular to the front-rear direction.

\* \* \* \* \*